United States Patent
Berman et al.

(10) Patent No.: US 8,914,334 B2
(45) Date of Patent: *Dec. 16, 2014

(54) USING A METADATA IMAGE OF A FILE SYSTEM AND ARCHIVE INSTANCE TO RESTORE DATA OBJECTS IN THE FILE SYSTEM

(75) Inventors: Steven M. Berman, Pittsburgh, PA (US); Dominic Mueller-Wicke, Mainz (DE); Wayne A. Sawdon, San Jose, CA (US); James P. Smith, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/612,792

(22) Filed: Sep. 12, 2012

(65) Prior Publication Data
US 2014/0074790 A1 Mar. 13, 2014

(51) Int. Cl.
*G06F 17/30* (2006.01)
*G06F 11/14* (2006.01)

(52) U.S. Cl.
CPC ........ *G06F 11/1435* (2013.01); *G06F 11/1469* (2013.01)
USPC .......................................... 707/686; 707/649

(58) Field of Classification Search
USPC .................................. 707/686, 649, 677, 685
See application file for complete search history.

(56) References Cited

U.S. PATENT DOCUMENTS

| | | | |
|---|---|---|---|
| 6,154,852 A | 11/2000 | Amundson et al. |
| 6,505,216 B1 | 1/2003 | Schutzman et al. |
| 6,981,005 B1 | 12/2005 | Cabrera et al. |
| 7,073,036 B2 | 7/2006 | Furuya et al. |
| 7,092,976 B2 | 8/2006 | Curran et al. |
| 7,103,740 B1 | 9/2006 | Colgrove et al. |

(Continued)

FOREIGN PATENT DOCUMENTS

| | | |
|---|---|---|
| CA | 2384020 | 9/2003 |
| EP | 0869439 | 10/1998 |

(Continued)

OTHER PUBLICATIONS

DMAPI—Wikipedia, the free encyclopedia, Jun. 7, 2011.*

(Continued)

*Primary Examiner* — William Spieler
(74) *Attorney, Agent, or Firm* — David W. Victor; Konrad, Raynes, Davda and Victor LLP (57) ABSTRACT

Provided are a computer program product, system, and method for using a metadata image of a file system and archive instance to restore files in the file system. A metadata image of the file system for a point-in-time backup as of a point-in-time includes information on files and directories in the file system as of the point-in-time and an archive instance including a copy of database records in the backup database for the files in the point-in-time backup. A restore request is received. A file representation is created of each file to restore in the directory structure of the file system from the metadata image, wherein at least one of the created file representations indicates that the file is stored off-line and has an external identifier used to access information on the file in the database records in the archive instance for the point-in-time backup.

23 Claims, 8 Drawing Sheets

(56) References Cited

U.S. PATENT DOCUMENTS

| | | | |
|---|---|---|---|
| 7,234,077 | B2 | 6/2007 | Curran et al. |
| 7,293,154 | B1 * | 11/2007 | Karr et al. .............. 711/202 |
| 7,398,365 | B1 | 7/2008 | Hardman |
| 7,620,843 | B2 | 11/2009 | Zohar et al. |
| 7,788,234 | B2 | 8/2010 | DePue et al. |
| 8,204,863 | B2 | 6/2012 | Sawdon |
| 2004/0267787 | A1 | 12/2004 | Huras et al. |
| 2004/0267822 | A1 | 12/2004 | Curran et al. |
| 2007/0294320 | A1 | 12/2007 | Yueh et al. |
| 2008/0010284 | A1 | 1/2008 | Beck |
| 2008/0177801 | A1 | 7/2008 | Garimella et al. |
| 2010/0211547 | A1 | 8/2010 | Kamei et al. |
| 2010/0287142 | A1 | 11/2010 | Wesener et al. |
| 2011/0153561 | A1 | 6/2011 | Sawdon et al. |
| 2011/0184915 | A1 | 7/2011 | Wu et al. |
| 2011/0191295 | A1 * | 8/2011 | Ozdemir et al. .............. 707/639 |
| 2011/0191300 | A1 | 8/2011 | Orenstein et al. |
| 2011/0218968 | A1 | 9/2011 | Liu et al. |
| 2012/0017043 | A1 | 1/2012 | Aizman et al. |

FOREIGN PATENT DOCUMENTS

| | | |
|---|---|---|
| WO | 2007002397 | 1/2007 |
| WO | 2007103289 | 9/2007 |
| WO | 2011082138 | 7/2011 |

OTHER PUBLICATIONS

Hierarchical storage management—Wikipedia, the free encyclopedia, Sep. 2, 2011.*

IBM General Parallel File System—Wikipedia, the free encyclopedia, Aug. 13, 2011.*

IBM Storage—Wikipedia, the free encyclopedia, Sep. 6, 2011.*

W. Zurcher, "The State of Clustered Systems", UNIX Review, dated Aug. 1995, (online), Retrieved from the Internet at URL>http://go.galegroup.com/ps/idoid=GALE7CA17466755&v=2.1&u=mtlib_1_1092&it=r&p=AONE&sw=w, pp. 1-5.

"A Method of Enabling File-Level Restore From Image-Level Backup", dated Aug. 30, 2012, pp. 1-6, (online), retrieved form the Internet at URL> http://priorartdatabase.com/IPCOM/000199284.

"Generalized Scalable Solution for Backing Up Very Large File Systems/Data Sets Via an External Interface into the Tivoli Storage Manager Backup/Archive Client", dated Oct. 25, 2008, pp. 1-3, (Online), retrieved from the internet at URL> http:www.ip.com/pubview/IPCOM000175793D.

Feng, D., et al "High Performance Virtual Backup and Archive System", INSPEC/Springer-Verlag; vol. 3993, 2006, 5 pages.

Forman, G., "Scaling Up Text Classification for Large File Systems", AMC International Conference on Knowledge Discovery & Data Mining (KDD'08), Aug. 24-27, 2008, 8 pages.

Green, R. et al., "Designing a Fast, On-line Backup System for a Log-structured File System", INSPEC/DT Journal vol. 8, No. 2, 1996, pp. 32-45.

IBM Corp. "Importance Based Backups", www.ip.com, IPCOM000133755D, Feb. 7, 2006, 2 pgs.

Kaczmarski, M. et al, "Beyond Backups Toward Storage Management", IBM Corporation, IBM Systems Journal vol. 42, No. 2, 2003, pp. 322-337.

Wang. et al., "The Conquest File System :Better Performance Through a Disk/Persistent-RAM Hybrid Design", ACM Transactions on Storage, vol. 2, No. 3, Aug. 2006, pp. 309-348.

Application entitled, "Using a Metadata Image of a File System and Archive Instance to Backup Data Objects in the File System", filed Sep. 12, 2012, by inventors Steven M. Berman et al., pp. 1-37.

Application entitled, "Hybrid Backup and Restore of Very Large Fil System Using Metadata Image and Traditional Backup", U.S. Appl. No. 13/439,535, filed Apr. 4, 2012 by Steven M. Berman et al., pp. 1-27.

Office Action, dated Oct. 29, 2013, for U.S. Appl. No. 13/612,785, filed Sep. 12, 2012, entitled, "Using a Metadata Image of a File System and Archive Instance to Backup Data Objects in the File System", invented by Steven M Berman et al., pp. 1-19 (37.289).

Response to Office Action, dated Jan. 29, 2014, for U.S. Appl. No. 13/612,785 (37.289), filed Sep. 12, 2012, entitled, "Using a Metadata Image of a File System and Archive Instance to Backup Data Objects in the File System", invented by Steven M Berman et al., pp. 1-9.

Notice of Allowance, dated Apr. 7, 2014, for U.S. Appl. No. 13/612,785 (37.289), filed Sep. 12, 2012, entitled, "Using a Metadata Image of a File System and Archive Instance to Backup Data Objects in the File System", invented by Steven M Berman et al., pp. 1-9.

* cited by examiner

FIG. 1

Metadata Image Entry

FIG. 2

Database Record

FIG. 3

Archive Instance Information

FIG. 4

File Representation

USING A METADATA IMAGE OF A FILE SYSTEM AND ARCHIVE INSTANCE TO RESTORE DATA OBJECTS IN THE FILE SYSTEM

BACKGROUND OF THE INVENTION

1. Field of the Invention

The present invention relates to a computer program product, system, and method for using a metadata image of a file system and archive instance to restore files in the file system.

2. Description of the Related Art

Typical data protection environments are based on client-server architectures. The backup server administers the common resources like disk storage and tape storage which are used to store the backup data from the client machines. The backup server uses a database to store metadata and statistical information about the backup clients and the common storage. Furthermore the backup server implements a functionality to create an instant archive. This instant archive may comprise a point-in-time copy of the active database at the backup server to allow for access of the backup as of the point-in-time the instant archive was created. Multiple backup clients connect to a single backup server and send their data for protection. The backup client decides the level of granularity used for the data protection. The traditional file level backup provides the whole file as the level of granularity for backup and restore and it uses the path to the file as the unique identifier. Block level backups provide a single block as the level of granularity and uses the block identifier as the unique identifier.

An image backup involves the backup of the complete contents of a physical storage media. In International Business Machines Corporation's ("IBM") General Parallel File System (GPFS™), a metadata image backup describes the ability to backup the metadata structure of a file system separately from the file object data. The metadata includes all components of the file system that are required to recreate the file system, but does not include the actual user data. A metadata image backup is typically used with the migrated data in a Hierarchical Storage Management (HSM) system to restore the file system in the event of a disaster. Once the metadata is restored, the file system may be brought on-line providing user access to the files. The data may be restored in bulk using an optimized tape order, or it may be restored on demand as users access individual files. (IBM and GPFS are registered trademarks of IBM in the United States and other countries).

Snapshot is a common industry term denoting the ability to create a point-in-time copy of all the data. Typically, snapshot creation is done instantly and the data is copied only when modified, referred to as a copy-on-write, in order to preserve the data as of the point-in-time the snapshot was created. Snapshots are made available for use by other applications such as data protection, data analysis reporting, and data replication applications. The original copy of the data continues to remain available, and writable to applications without interruption, while the snapshot copy is used to perform specialized read-only functions. A software snapshot typically is provided from a file system (e.g. IBM's GPFS). The GPFS snapshot creates an instant copy of the entire directory structure. The files in the recently created directory structure are only links to the files in the active (live) file system. A write operation on a file initiates creating a copy of the original data blocks into the snapshot structure before the write operation proceeds (copy-on-write). A hardware snapshot may be implemented inside the storage system, such as with the IBM DS8000®. (DS8000 is a registered trademark of IBM in the United States and other countries). The hardware snapshot creates an instant copy of a primary disc image on a secondary disc. This copy-on-write mechanism works similarly to the software mechanism but operates at the storage device block level. Note that a snapshot, by itself, does not constitute a backup, since the data is not copied to a second storage medium and thus not protected against failures. Snapshots are typically used by the backup system to create a point-in-time consistent version of the file system.

The goal of recovery is to bring a file system back into use as quickly as possible. For large file systems, restoring all of the user data from an off-line media, such as tapes, may take an extended period, such as weeks. The time may be substantially reduced using an HSM system, by restoring the file system's metadata, such as the directories and file attributes, and not restoring the actual data. In a typical file system, the metadata represents about 1% of the total data, thus reducing the time for recovery to minutes or hours. The actual data is restored when it is accessed by the user in the same manner as an on-demand recall from off-line HSM storage. The on-demand recall depends on two underlying features: First there must be a way to intercept the user access (such or read or write) and suspend the user thread; meanwhile a signal is sent to the HSM system to restore the data. Once the data is restored, the user thread is resumed. Typically, for an HSM system this mechanism is part of the X/Open Data Management API standard ("DMAPI"). Second, the HSM system assigns the data a unique external identifier which corresponds to a database entry that contains the physical location of the data. This external identifier does not depend on the name of the file, or the path to the file, or even on the file's location such as its physical disk address or logical inode number. The external identifier remains unchanged even as the file changes.

A backup and restore system may consist of the following components: a client or computer system that will be protected; a data protection client which coordinates the protection of the client system and initiates and monitors the data transfer for backup and restore; a data protection server which manages storage devices that are used to store the data of protected client systems and implements a scheduler that can initiate the data protection. A common network infrastructure is used for communication between the components, such as Ethernet, and a Storage Area Network (SAN) may be used for data transfer.

A backup of the data is started to initiate and monitor the backup of the data in a file system or a subset of a file system. The backup may be triggered by a scheduler or manually by the administrator. A backup session is established to read the data and send the data to a backup server to store.

A restore operation may be triggered by the administrator. The backup client connects to and establishes a restore session with the backup server and requests the data. The restore sessions ends if the data was successfully restored and written to the client file system.

A classic file based backup and restore involves a regular file system scan to collect the required information for the backup. The backup will be done at the object level. A restore requires that each object be named (e.g. by pathname or inode number) and its real data can then be fetched when the object is restored.

A classic block level backup and restore requires change tracking at a storage device block level to collect the required information for the backup. The backup and the restore happen on storage media block level.

A software snapshot based backup and restore requires that the file system which is used for the backup provides software snapshot functionality. A snapshot primarily creates a point-in-time copy of the data. After taking the snapshot the backup procedure reads the snapshot data to protect the file system by copying to backup media.

A hardware snapshot based backup and restore requires that the hardware which is used for the backup provides hardware snapshot functionality. A snapshot creates a point-in-time copy of the data. After taking the hardware snapshot, the backup procedure reads the hardware snapshot data to protect the file system by copying to the backup media.

An HSM based metadata image backup and restore requires HSM management of the file system. An integrated backup/archive and HSM server provides the means to utilize a single tape library for both backup data and HSM storage. Protected file data resides on either tape or both on live disk and on tape. A file system metadata image (inode data) is constructed for backup and must be sent to the backup server.

There is a need in the art for improved techniques for backup and restore of objects in a file system.

SUMMARY

Provided are a computer program product, system, and method for using a metadata image of a file system and archive instance to restore files in the file system. A metadata image of the file system for a point-in-time backup as of a point-in-time includes information on files and directories in the file system as of the point-in-time and an archive instance including a copy of database records in the backup database for the files in the point-in-time backup. A restore request is received to restore at least one file from the point-in-time backup. A file representation is created of each file to restore in the directory structure of the file system from the metadata image, wherein at least one of the created file representations indicates that the file is stored off-line and has an external identifier used to access information on the file in the database records in the archive instance for the point-in-time backup.

DETAILED DESCRIPTION

The described embodiments provide a scalable backup and restore system used with a cluster file system to provide a backup and restore, and reversion of user data and file system metadata. The described embodiments allow a rapid return to operation for restores of large file systems. To perform a point-in-time backup of files in a file system, a metadata image is generated of the file system including information on files and directories in the file system as of the point-in-time. After the files are backed-up in a backup storage, an archive instance is generated including a copy of database records in a backup database for the files in the point-in-time backup whose files are stored in the backup storage.

During a restore operation, a directory structure is created in the file system from the metadata image. A file representation of each file to restore in the directory structure of the file system is then created from the metadata image. After the file representations are created, the data may be maintained offline in the backup storage and recalled in response to a user request to access a file represented by a file representation in the file system but having data offline. In this way, users may be provided fast access to the restored file system consisting of the restored directory and file representations (also known as stub files), and when the user attempts to access a file whose data has not been restored, at that time the data would be retrieved from the backup storage and made available to the user.

Figure 1:
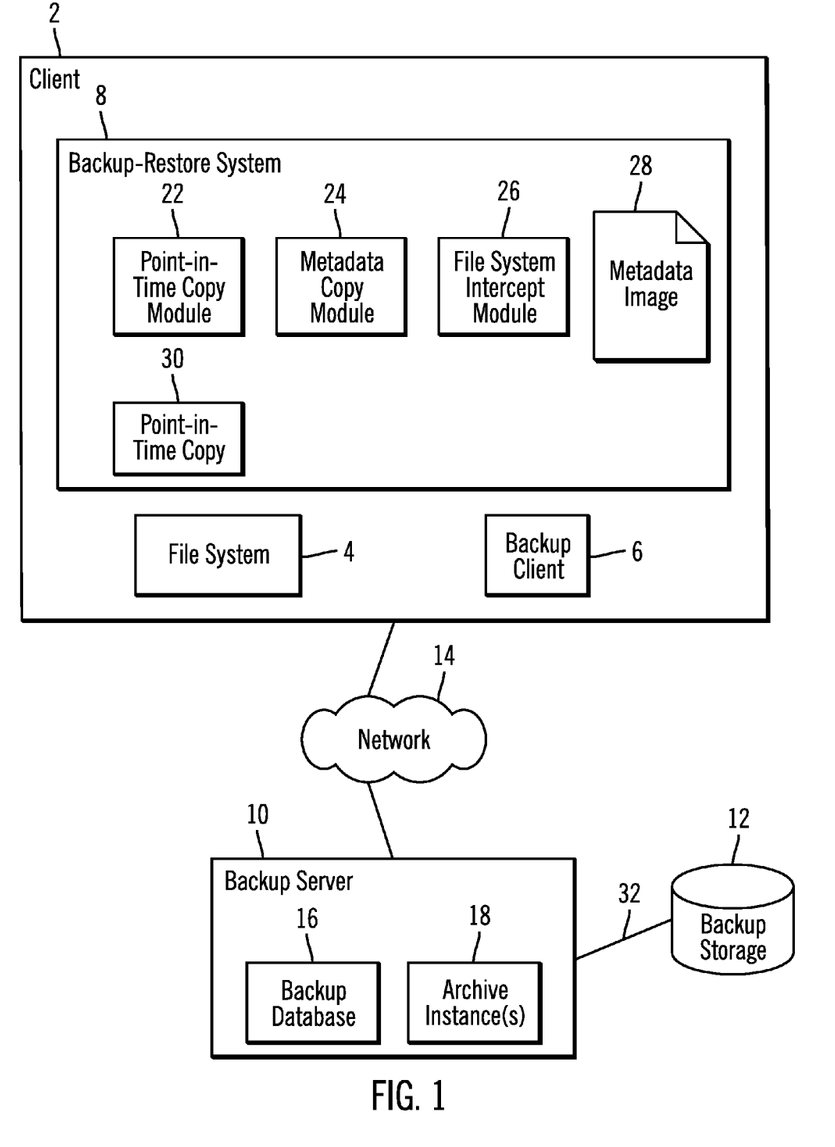
FIG. 1 illustrates an embodiment of a backup and storage environment.

FIG. 1 illustrates an embodiment of a backup environment. A client 2 includes a file system 4 having files in a directory structure to backup. The files to backup may comprise non-directory file system entities, such as files, device nodes, sockets, pipes and any other type of data file or data structure maintained in the file system 4. Files, also referred to as file objects, in the file system 4 may be backed up by a backup client 6 and a backup-restore system 8. The backup client 6 communicates with a backup server 10 to coordinate the back-up of files in the file system 4, and initiates and monitors backup and restore operations with respect to the backup server 10. The backup sever 10 stores backup data objects in a backup storage 12. A backup data object includes the stored files and other information in the file system. The backup server 10 may implement a scheduler to initiate backup operations. The client 2 and the backup server 10 may communicate over a network 14.

The backup server 10 maintains a backup database 16 having a record for each file backed up from the file system 4 in the backup storage 12 and one or more archive instances 18 having database records for files backed-up as of a point-in-time, which are stored in the backup storage 12.

A backup-restore system 8 manages backup and restore operations of the described embodiments in conjunction with the backup client 6. The backup-restore system 8 includes a point-in-time copy module 22 to create point-in-time copies 30 of files in the file system 4, such as a snapshot or Flash-Copy of the files; a metadata copy module 24 to extract all information from the file system 4 that is needed to rebuild the file system 4 structure and create a metadata image having information on file system objects including directories and files; a file system intercept module 26 to intercept file requests directed to a file being restored; and a metadata image 28 comprising an image of the file system 4 created by the metadata copy module 24. The point-in-time copy module 22 may create a point-in-time copy 30 of the file system 4, such as a snapshot, by utilizing copy-on-write, which may create a static and read-only view of the file system 4, from which the metadata image 28 can then be created and from which a traditional full or incremental backup can be created. The point-in-time copy of the file system may remain available for as long as is convenient, and may be discarded after the metadata image 28, archive instance 18, and backup file data have been saved to backup storage 12. A point-in-time backup refers to the point-in-time copy 30, the archive instance 18, metadata image 28, and related files in the backup storage 12 for a point-in-time copy.

The file system intercept module 26 may call the backup client 6 to restore files that are being accessed but have not yet been restored from the backup storage 12 to the file system 4. The backup client 6 may further be used to create the archive instances 18.

The backup-restore module 8 and the backup client 6 may be implemented on the same computer node or at different nodes in the network.

The backup client 6, backup-restore system 8, and the backup server 10 may be implemented as program code loaded into a memory for execution by a processor. Further, some or all of the functions of these programs may be implemented in hardware devices, such as in Application Specific Integrated Circuits (ASICs), Field Programmable Gate Array (FPGA), etc.

The backup storage 12 and the client 2 storage (not shown) storing the file system 4 may comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 14 may comprise a network such as a Local Area Network (LAN), Storage Area Network (SAN), Wide Area Network (WAN), peer-to-peer network, wireless network, etc. The backup storage 12 may connect to the backup server 10 directly via a connection line 32, such as a bus, cable, interconnect, or over the network 14.

Figure 2:
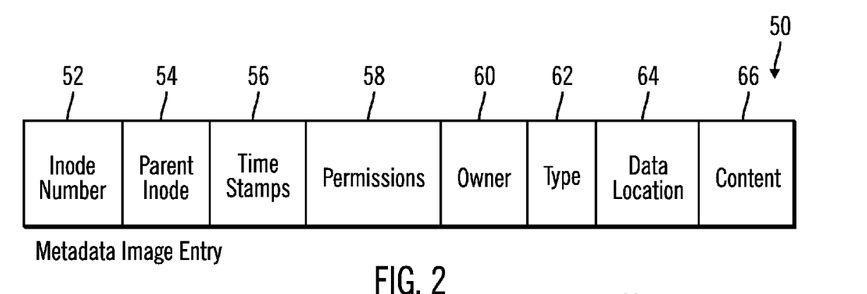
FIG. 2 illustrates an embodiment of a metadata image entry.

FIG. 2 illustrates an embodiment of an entry 50 in the metadata image 28 for each file system object, e.g., file, directory, in the file system 4 being backed-up. The entry 50 includes an inode number 52 identifying the file system object; a parent inode 54 identifying a parent directory in which the file system object identified by inode number 52 is immediately included; time stamps 56 indicating a time the identified file system object was accessed, modified, created, etc; permissions 58 indicating users granted different access to the file system object, e.g., read, write, author, etc.; an owner 60 that created the file system object; a type 62 of the file system object, such as file, directory, etc.; a data location 64 indicating a location of the file in the backup storage 12; and content if the represented file is deemed small, i.e., below a size threshold. In certain embodiments, the metadata image 50 may not include all the fields described above or include additional information on the file system objects, such as an access control list (ACL) and other information.

Figure 3:
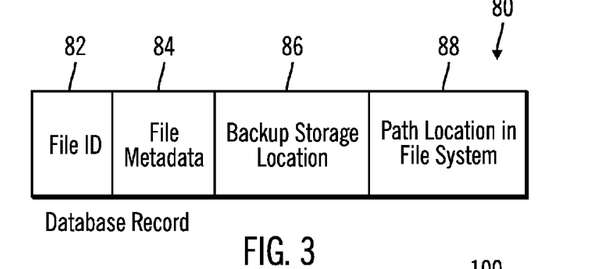
FIG. 3 illustrates an embodiment of a database record in a backup database.

FIG. 3 illustrates an embodiment of a database record 80 for a file backed-up in the backup storage 12 in the backup database 16, which may also be stored in the archive instances 18. The record 80 includes a file identifier 82, comprising a unique identifier of the file; file metadata 84 providing attributes of the file, such as size, date last modified, creator, etc.; a backup storage location 86 in the backup storage 12 where the file is stored; and a path location 88 in the file system, such as the directory path and file name, where the file is located in the directory structure of the file system 4 from which the file is backed-up. In certain embodiments, the file ID 82 and/or the path location 88 may be used to provide a unique identifier of the file represented by the record 80.

Figure 4:
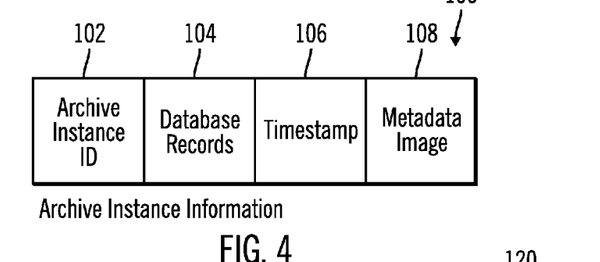
FIG. 4 illustrates an embodiment of archive instance information.

FIG. 4 illustrates an embodiment of archive instance information 100 maintained for each of the archive instances 18, including an archive instance identifier 102; one or more database records 104 from the backup database 16 for files included in a point-in-time backup; a timestamp 106 at which the point-in-time backup was created; and a metadata image 108. The metadata image 108 may comprise the metadata image 28 itself or a pointer to the metadata image 28 in the backup storage 12. In this way, the archive instance information 100 associates an archive instance 102 with a metadata image 28 for a point-in-time backup. In alternative embodiments, different data structures and information may be used to associate an archive instance 18 and metadata image 28 for a point-in-time backup. Further, the archive instance 18 may include additional information on the point-in-time backup, such as the point-in-time copy 30 generated by the point-in-time copy module 22 to create the point-in-time backup.

Figure 5:
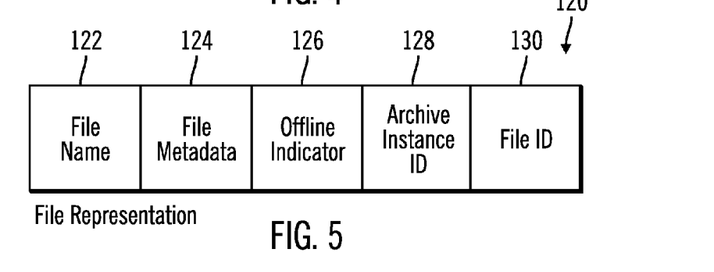
FIG. 5 illustrates an embodiment of a file representation.

FIG. 5 illustrates an embodiment of a file representation 120, or stub file, that is restored in the file system 4 for a file being restored. The file representation 120 may comprise a stub file or other data structure to represent and provide metadata on the file. A file representation 120 includes a file name 122 in the file system 4; file metadata 124 having attributes of the file, such as the size, creator, permissions, etc.; an offline indicator 126 indicating whether the file is stored local in the file system 4 or offline in the backup storage 12; an archive instance identifier 128 indicating the archive instance 18 from which the file is restored; and a file identifier 130 providing a unique file identifier, such as unique code used by the backup database 16 to identify the file and/or the path location in the file system 4 of the file. Thus the file ID 130 may be used to find the database record 80 providing information on the represented file in the backup storage 12.

Figure 6:
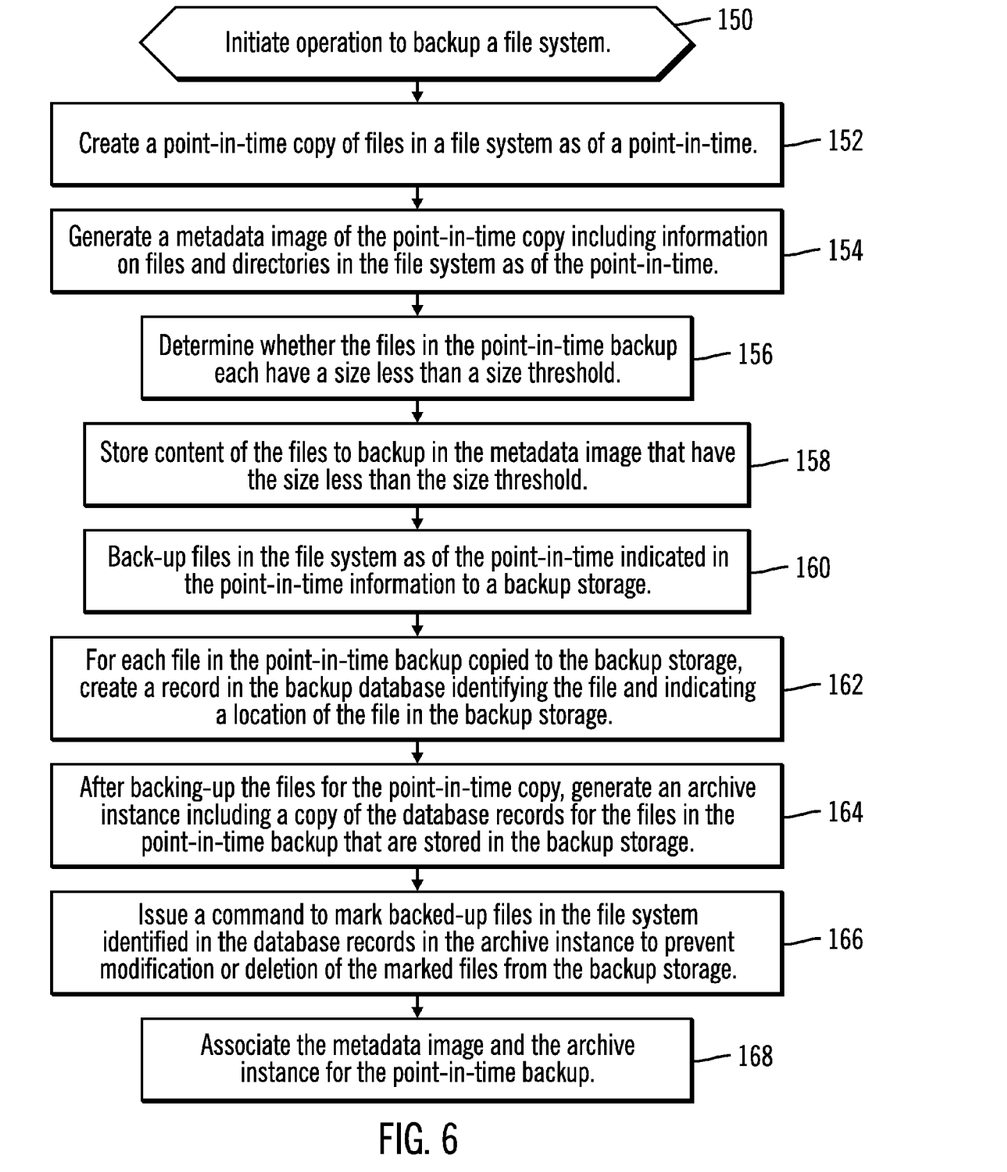
FIG. 6 illustrates an embodiment of operations to backup a file system.

FIG. 6 illustrates an embodiment of operations performed by the backup-restore system 8 modules working with the backup client 6 to backup some or all of the file system 4. Upon initiating (at block 150) an operation to backup the file system 4, the point-in-time copy module 22 may create (at block 152) a point-in-time copy 30, e.g., snapshot, of files in the file system 4 as of a point-in-time. The metadata copy module 24 generates (at block 154) a metadata image 28 of the file system 4 represented in the point-in-time copy 30, including information on files and directories in the file system 4 as of the point-in-time. The metadata copy module 24 may include an entry 50 (FIG. 2) for each file system object in the file system 4 subject to the backup, including each file, directory, device node, socket, pipe, etc. The metadata copy module 24 may further determine (at block 156) whether each of the files in the point-in-time backup has a size less than a threshold size, i.e., is a small file. The metadata copy module 24 may then store (at block 158) content of the files having a size less than the threshold in content field 66 (FIG. 2) in the metadata image 28. This allows small files to be directly restored from the metadata image 28 without having to perform a restore from the backup server 10 and backup storage 12. The point-in-time copy module 22 may call the backup client 6 to back-up (at block 160) files in the file system 4 as of the point-in-time of the backup to the backup storage 12. In one embodiment, the backup of files in the point-in-time backup may comprise an incremental backup to only copy those files or parts of files that have changed since the last backup of the file to the backup storage 12. For each file in the point-in-time backup copied, in whole or in part, to the backup storage 12, the backup server 16 creates (at block 162) a record 80 in the backup database 16 identifying the file, such as in the file ID 82 and/or path location 88 fields, and indicating a location of the file 86 in the backup storage 12. After backing-up the data for all file objects from the point-in-time copy 30 to the backup storage 12, the backup client 6 may request the backup server 10 to generate (at block 164) an archive instance 18 including a copy of the database records 80 for all the files in the point-in-time copy 30 that are stored in the backup storage 12. In this way, the archive instance 18 is created as part of the backup process, so that the database records 80 will be available in the archive instance 18 for a subsequent restore request.

The file system intercept module 26 may further issue (at block 166) a command to mark backed-up files in the backup storage 12 identified in the database records 104 in the archive instance 18 to prevent modification or deletion of the marked files from the backup storage 12. The files may be marked by adding a reference count to the file's database record 80 in the backup database 16. The metadata image 28 may then be associated with the archive instance 18 for the point-in-time backup. In one embodiment, the metadata image 28 is associated (at block 168) with the archive instance 18 by indicating the metadata image 108 in the archive instance information 102 (FIG. 4).

The backup server 10 may store multiple archive instances created for different point-in-time backups at different points-in-time, wherein each archive instance 18 includes records from the backup database 16 for files in the point-in-time backup to allow for the recovery of the files in the different point-in-time backups of the file system 4.

Figure 7:
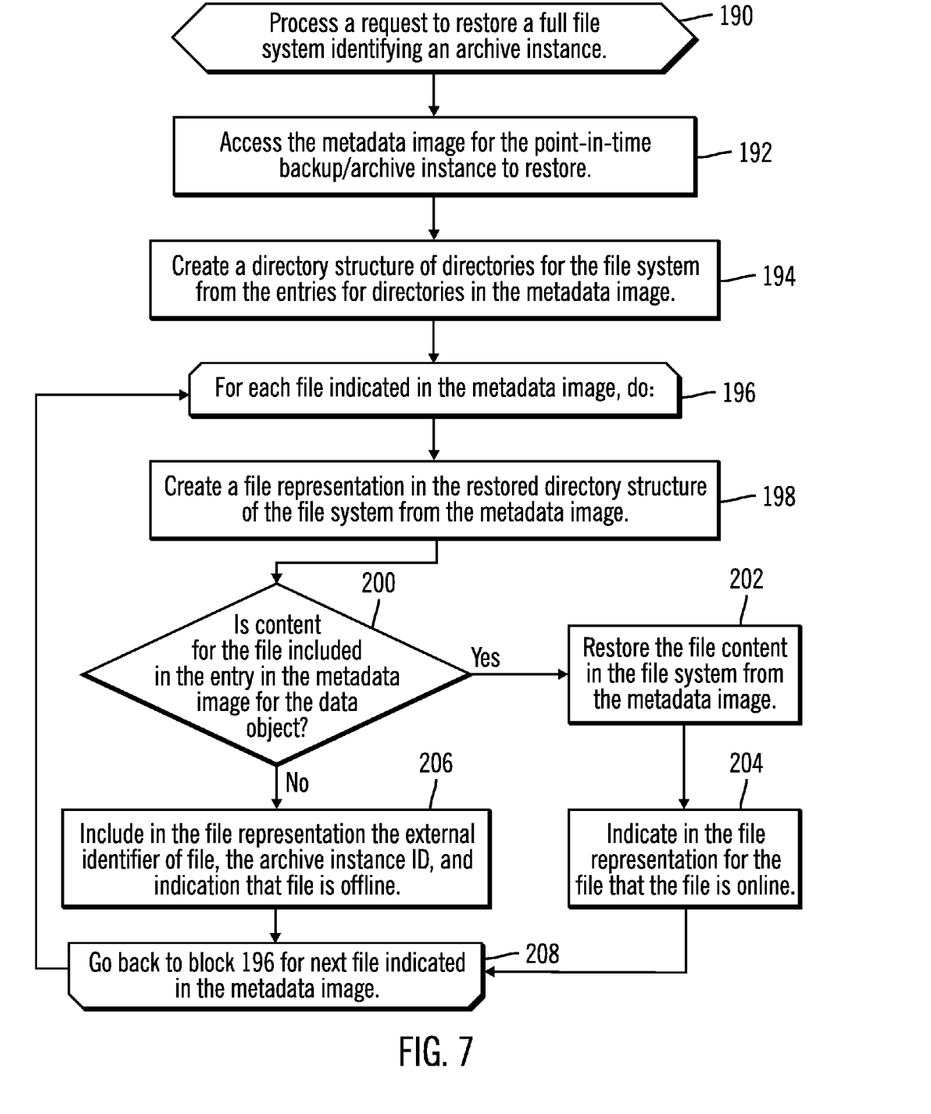
FIG. 7 illustrates an embodiment of operations to restore a full file system.

FIG. 7 illustrates an embodiment of operations performed by the backup-restore system 8 to process a request to restore a full file system 4, where the request indicates an archive instance 18. Upon receiving (at block 190) the request to restore the full file system, the system backup-restore system 8 accesses (at block 192) the metadata image 28 and archive instance 18 for the point-in-time backup to restore. The backup-restore system 8 creates (at block 194) a directory structure of directories for the file system 4 from the entries for directories in the metadata image 28. For each file indicated in an entry 50 in the metadata image 28, the backup-restore system 8 creates (at block 198) a file representation 120 (FIG. 5) of the file in the restored directory structure of the file system 4 from the directory metadata image entries 50. If (at block 200) there is content 66 for the file in the entry 50 in the metadata image 28 being considered, then the file content is restored (at block 202) to the file system 4 from the metadata image 50 content 66. Indication is made (at block 204) in the offline indicator 126 in the representation 120 for the file that the data is on-line. If (at block 200) the content is not included in the metadata image entry 50 for the file to restore, then the file representation 120 is updated (at block 206) to include its external identifier 130, the archive instance identifier 128, and the indication that the file is offline 126. The external identifier 130 and archive instance identifier 128 may also be added to a file representation 120 of a file having content offline. The external identifier 130 may comprise a unique identifier of the file used by the backup database 16 or a path location of the file in the file system 4 at the time of backup. After updating the representation 120 from block 204 or 206, control proceeds (at block 208) back to block 196 to consider a next file indicated in the metadata image 28 for the point-in-time backup until all files indicated in the metadata image 28 are processed.

Figure 8:
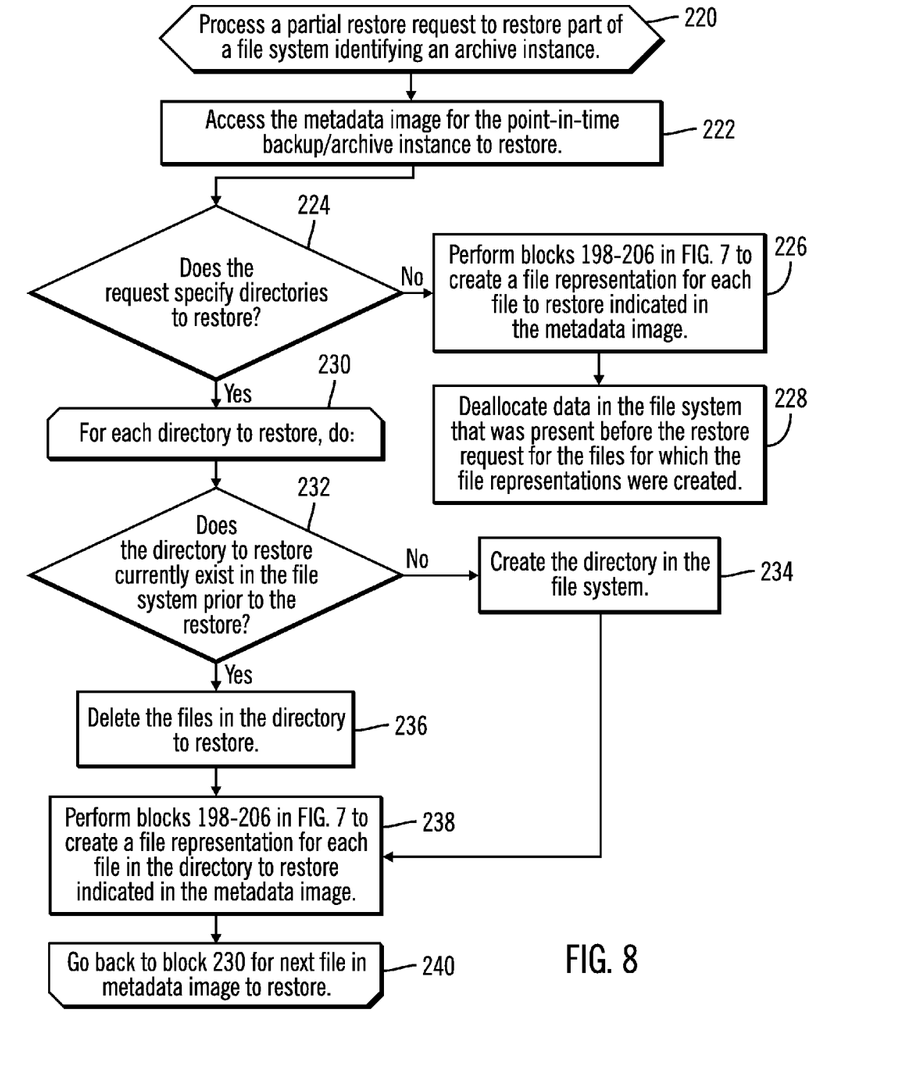
FIG. 8 illustrates an embodiment of operations for a partial restore of a file system.

FIG. 8 illustrates an embodiment of operations performed by the backup-restore system 8 to perform a partial restore request to restore part of a file system, including directories and/or files, into an existing file system 4. Upon initiating (at block 220) the partial restore operation, the backup-restore program 8 accesses (at block 222) the metadata image 28 and archive instance 18 for the point-in-time backup to restore. If (at block 224) the restore request does not include directories to restore, i.e., only files, then the backup-restore system 8 performs (at block 226) the operations at blocks 198-206 in FIG. 7 to create a file representation 120 for each file to restore from the metadata image 28. The data in the file system 4 that was present before the restore request for the files for which the file representations 120 were created, at block 226, is deallocated because that data may not be current as of the point-in-time of the backup from which the files are restored.

If (at block 224) the restore request specifies directories to restore, then the backup-restore system 8 performs (at blocks 230-240) the operations at blocks 232-238 for each directory to restore. If (at block 232) the directory to restore does not currently exist in the file system prior to the restore, then the directory is created (at block 234) in the file system. If (at block 232) the directory to restore already exists in the file system 4, then the files in the directory are deleted (at block 236). From block 234 or 236, the operations at blocks 198-206 in FIG. 7 are performed to create a file representation 120 for each file in the directory to restore indicated in the metadata image 28.

Figure 9:
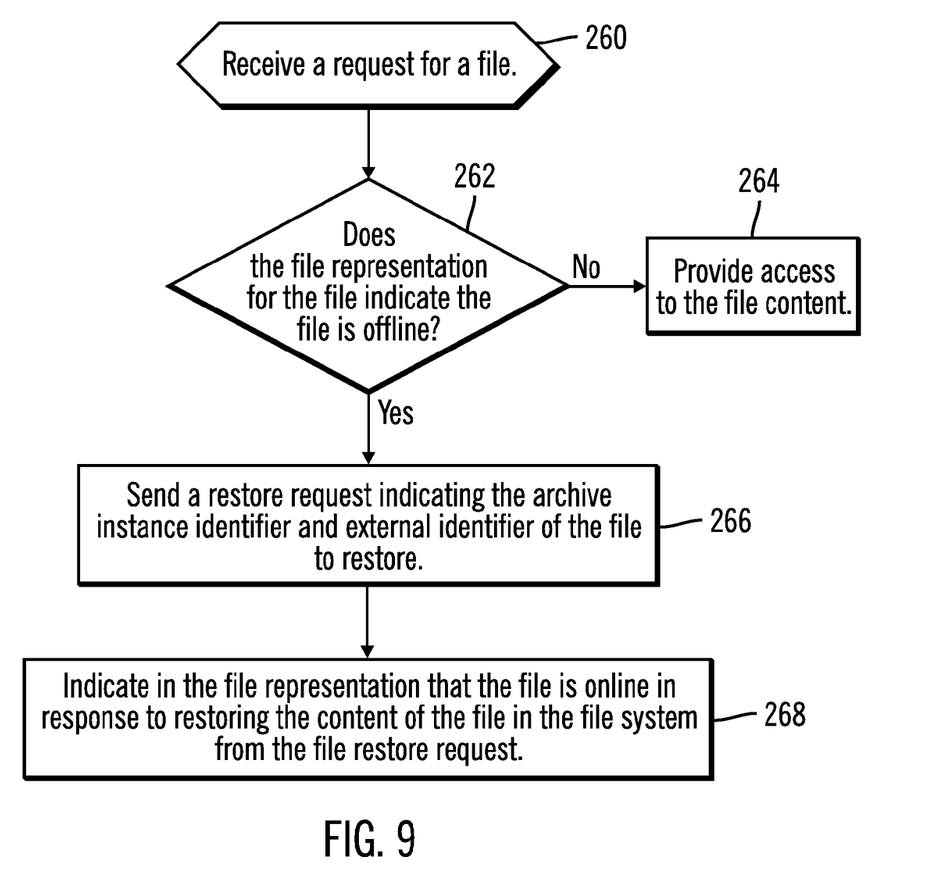
FIG. 9 illustrates an embodiment of operations to process a request for a file.

FIG. 9 illustrates an embodiment of operations performed by the file system intercept module 20 to process a request for access to a file in the file system 4. Upon receiving (at block 260) the request, if (at block 262) the file representation 262 of the requested file indicates in the offline indicator 126 that the data for the file is online, then access is provided (at block 264) to the online file. If (at block 262) the data for the file is offline, then the file system intercept modules 20 sends (at block 266) a restore request indicating the archive instance identifier 18 and external identifier of the file to restore from the backup server 10. The file representation 120 is subsequently updated (at block 268) to indicate that the data for the file is on-line in response to restoring the file in the file system 4 from the file restore request sent to the backup server 10. The update at block 268 converts the file representation 120 into a regular file in the file system 4 since its data has been restored.

Figure 10:
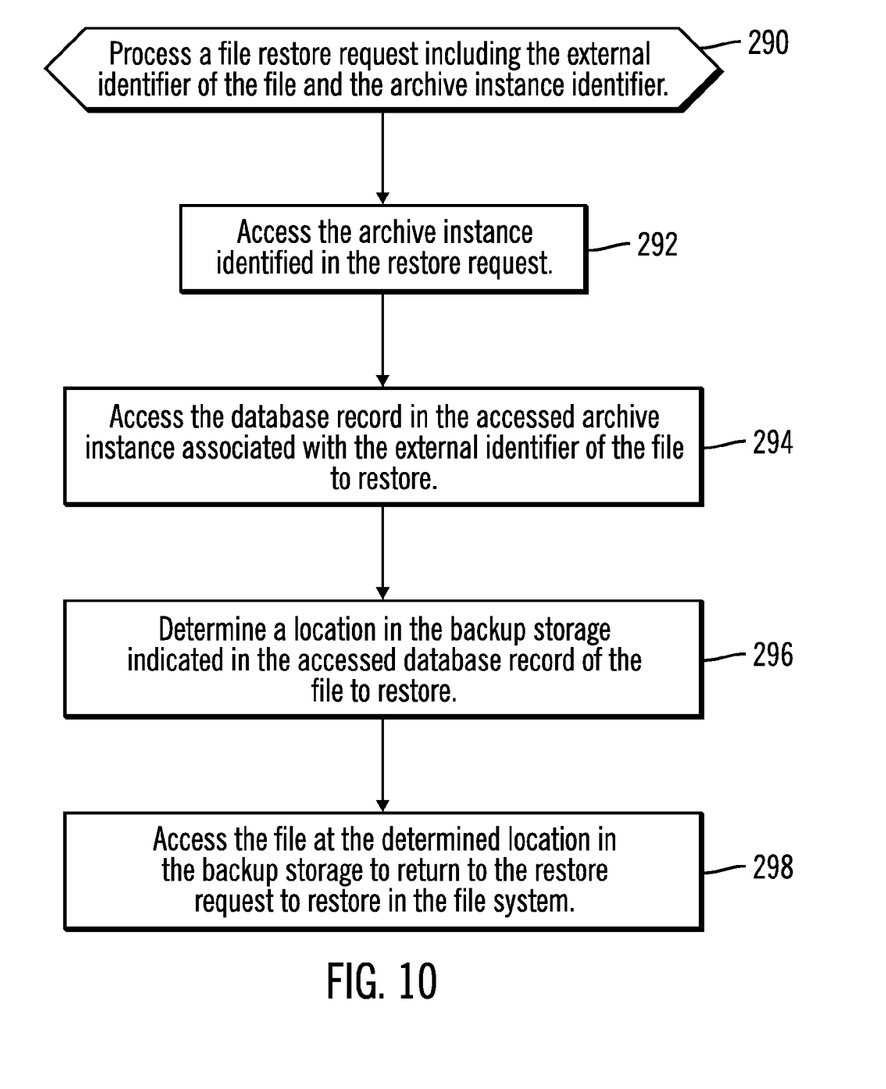
FIG. 10 illustrates an embodiment of operation to process a restore request.

FIG. 10 illustrates an embodiment of operations performed by the backup server 10 to process a file restore request. The file restore request may be generated at block 266 in FIG. 9 to bring online the content of the file whose accessed file representation 120 indicates is offline in field 126. Upon receiving (at block 290) a file restore request including the external identifier 130 of the file and the archive instance 218 identifier, the backup server 10 accesses (at block 292) the archive instance 18 identified in the restore request. The database record 80 in the accessed archive instance 18 associated with the external identifier of the file to restore is accessed (at block 294). The external identifier in the restore request for the file may be used to find the database record 80 having the matching file ID 82 or path location 88, depending on what is used for the file identifier. The backup server 10 determines (at block 296) a location in the backup storage 12 indicated in field 86 in the accessed database record 80 of the file to restore. The file at the determined location 86 in the backup storage 12 is accessed to return to the restore request to restore the file content to the file system 4.

The restore operations of FIG. 10 allow the restoration of a file to a directory in the file system 4 even if the directory name in the file system 4 is changed subsequent to the restoration of the file system 4 and the file representations 120, i.e., stub files, in the file system 4, but before the restoration of the data for a file. The file content can be restored in a directory whose name has changed because the original file path or other unique identifier of the file may be used to identify the file to restore in the file representation 120. This original file path name 130 in the file representation 120 is used to access the database record 80 in the archive instance 100 having a matching path location 88, which provides the backup storage location 86 of the file to restore. For example, assume an archive instance 100 created as part of a backup of the file system 4 includes an original file path name, e.g., "/gpfs/user/steve/project/animals/dog". The archive instance 100 may be created with database records 80 using the original path name as a unique identifier 88 of the file. If there is a system problem resulting in loss of data and the file system 4 is restored from the point-in-time backup using archive instance information 100, the original directory structure is restored along with all file representations 120, which include that original directory name as part of the path name in the unique identifier 130, e.g., "/gpfs/user/steve/project/animals/dog". If the restored directory, e.g., "/gpfs/user/steve/project/animals" is subsequently renamed to a new directory name, e.g., "/gpfs/user/steve/project/mammals", this renaming does not affect the later restoration of the file content for file "dog" represented by the file representation 120 in the renamed directory because the original file path name included in the file representation 120 is used to access the database record 80 to restore the file. The backup data accessed using the original file path name, e.g., "/gpfs/user/steve/project/animals/dog", as an identifier is restored into the new directory name, e.g., "/gpfs/user/steve/project/mammals/dog" from which the stub file 120 was accessed, and a file access request may then be granted from this restored file data.

The operations of FIGS. 6-10 described as performed by modules of the backup-restore system 8, backup client 6 and backup server 10 may be performed by modules and components other than those described, including the above mentioned modules and programs and additional programs and modules.

Described embodiments provide the ability to restore a large file system to functional usability after a disaster in very short time compared to traditional tape-based restore methods and the ability to restore the user data on demand without requiring the data to be stored in an HSM system. With described embodiments, a file system may revert a single file system object or subset of objects from a backup. Described embodiments provide the ability to restore a directory structure of the file system from the metadata image 28, including directory and file names, object (inode) identifiers, and various modes, times, and attributes for each object, including the file permission and access control lists (ACLs). With described embodiments, a "skeleton" or structure of the file system is brought back on-line very quickly for use even in advance of having restored any of the files. File data read or write requests are intercepted and there is interaction with the backup server to prioritize the fetch of the archived data for a requested file.

Figure 11:
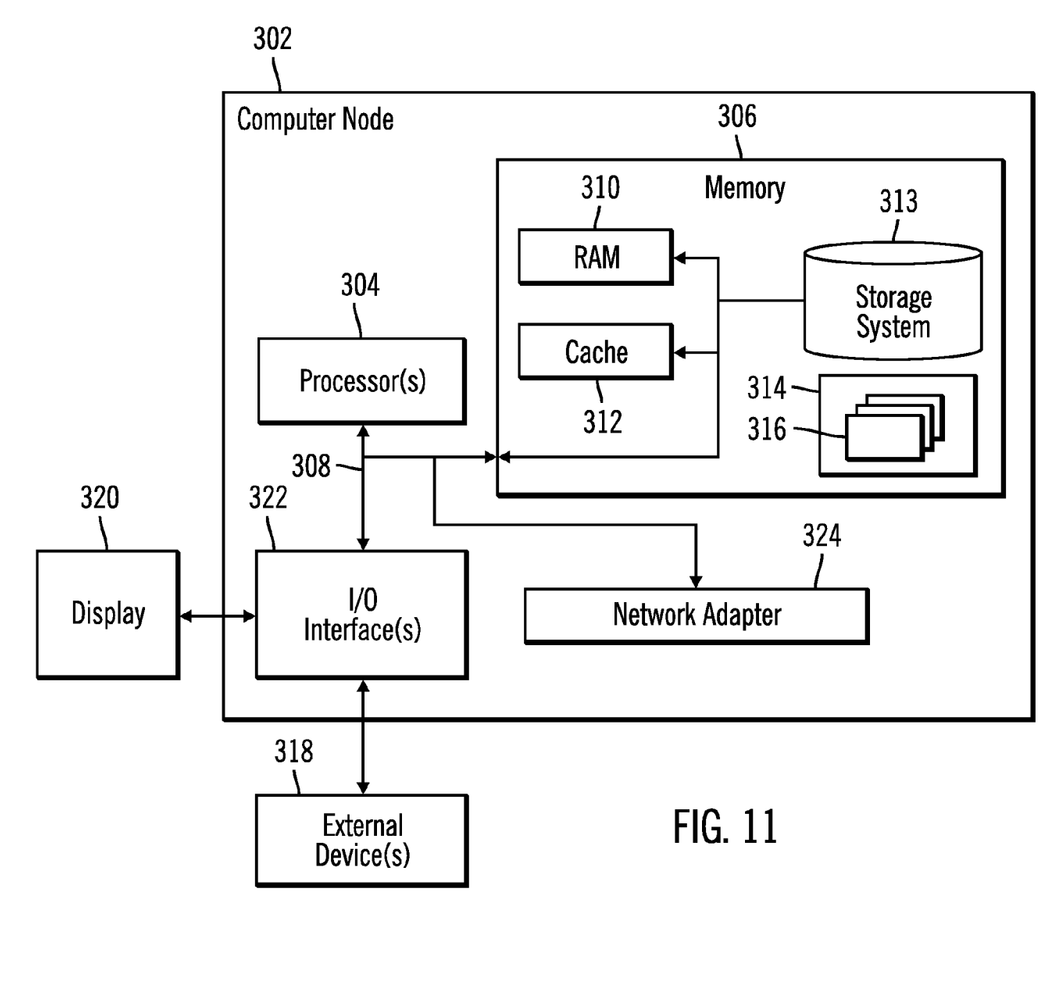
FIG. 11 illustrates an implementation of a computer node in the computing environment.

FIG. 11 illustrates an embodiment of a computer node 302 which may comprise an implementation of the client 2, backup-restore system 8, and backup server 10. Alternatively, the backup-restore system 8 may be implemented as a combination of hardware and/or software in the client 2. The client 2, backup-restore system 8, and backup server 10 may be implemented in a cloud computing environment in which the backup-restore system 8 and backup server 10 provide backup and restore services to the client 2. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the metadata images 28, backup database 16, and archive instances 18.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the backup-restore system 8, backup client 6, and backup server 10.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for restoring files in a file system, wherein a backup database has information on backed-up files, the computer program product comprising a computer readable storage medium having computer readable program code embodied therein to perform operations, the operations comprising:

maintaining for a point-in-time backup, as of a point-in-time, a metadata image of the file system including information on files and directories in the file system as of the point-in-time and an archive instance including a copy of database records in the backup database for the files in the point-in-time backup, wherein the metadata image includes content of files that have a size less than a threshold size;

receiving a restore request to restore at least one file from the point-in-time backup;

creating a file representation of each file to restore in a directory structure of the file system from the metadata image, wherein at least one of the created file representations indicates that the file is stored off-line and has an external identifier used to access information on the file in the database records in the archive instance for the point-in-time backup;

for files having content included in the metadata image, restoring the file content in the file system from the metadata image; and indicating in the file representation for the file restored from the metadata image that the file is on-line.

2. The computer program product of claim 1, wherein the restore request is to restore an entire file system, wherein the operations further comprise:

creating a directory structure of directories from the metadata image in the file system, wherein the file representation of each file in the file system is included in directories in the directory structure as indicated in the metadata image.

3. The computer program product of claim 1, wherein the operations comprise:

storing multiple archive instances created for different point-in-time backups at different points-in-time, wherein each archive instance includes records from the backup database for files subject to the backup at the point-in-time to allow for the recovery of the files in the different point-in-time backups to the file system, wherein the restore request is for one of the archive instances.

4. The computer program product of claim 1, wherein the operations further comprise:

receiving a request for a file in the file system;

determining whether the file representation of the requested file indicates that the file is off-line;

sending a restore request indicating the external identifier of the file in the archive instance in response to determining that the file representation indicates that the file is offline; and indicating in the file representation of the file that the file is on-line in response to restoring the file in the file system from the restore request.

5. The computer program product of claim 1, wherein the file representation further includes an archive instance identifier of the archive instance from which the file system was restored, wherein the operations further comprise:

sending a restore request for a file in the file system whose file representation indicates that the file is off-line, wherein the restore request includes the archive instance identifier and the external identifier of the file to restore;

accessing the archive instance identified in the restore request;

accessing the database record in the accessed archive instance associated with the external identifier of the file to restore;

determining a location in a backup storage indicated in the accessed database record of the file to restore; and accessing the file at the determined location in the backup storage to return to the restore request to restore in the file system.

6. The computer program product of claim 5, wherein the file identifier comprises a path to the file in the file system, and wherein the record in the backup database for each file includes the path to the file in the file system to identify the file.

7. The computer program product of claim 1, wherein the restore request is a partial restore to restore at least one file into the file system from the point-in-time backup, wherein the file representations are created for the at least one file to restore, wherein the operations further comprise:

deallocating data in the file system that was present before the restore request for the files for which the file representations were created.

8. The computer program product of claim 7, wherein the data in the file system is deallocated when creating the file representation for the file or when restoring the data for the file in the file system.

9. The computer program product of claim 1, wherein the restore request is a partial restore to restore at least one directory into the file system from the point-in-time backup, wherein the file representations are created for each file in the at least one directory to restore from the metadata image, wherein the operations further comprise:

determining whether the at least one directory to restore currently exists in the file system prior to the restore;

deleting files in the determined at least one directory to restore that currently exist; and creating the file representations for the files in the determined at least one directory that currently exists from the metadata image.

10. The computer program product of claim 9, wherein the operations further comprise:

creating a directory structure for each directory to restore that does not currently exist in the file system prior to the restore to include the file representations of the files in the directory to restore.

11. A computer program product for restoring files in a file system, wherein a backup database has information on backed-up files, the computer program product comprising a computer readable storage medium having computer readable program code embodied therein to perform operations, the operations comprising:

maintaining for a point-in-time backup, as of a point-in-time, a metadata image of the file system including information on files and directories in the file system as of the point-in-time and an archive instance including a copy of database records in the backup database for the files in the point-in-time backup;

receiving a restore request to restore at least one file from the point-in-time backup;

creating a file representation of each file to restore in a directory structure of the file system from the metadata image, wherein at least one of the created file representations indicates that the file is stored off-line and has an external identifier used to access information on the file in the database records in the archive instance for the point-in-time backup, wherein the restored directory structure includes a first directory name including a plurality of file representations that include the first directory name in a unique identifier to identify the database record for the file;

renaming the first directory name in the directory structure to a second directory name following the restoration of the directory structure in response to the restore request;

receiving a request to access at least one file in the second directory name whose file representation indicates that the file is off-line;

sending a restore request including the first directory name to identify the requested file in the archive instance;

storing the file returned in response to the restore request in the second directory name in the file system.

12. A system for backing-up a file system using a backup database, comprising:

a processor; and a computer readable storage medium including code executed by the processor to perform operations, the operations comprising:

maintaining for a point-in-time backup, as of a point-in-time, a metadata image of the file system including information on files and directories in the file system as of the point-in-time and an archive instance including a copy of database records in the backup database for the files in the point-in-time backup, wherein the metadata image includes content of files that have a size less than a threshold size;

receiving a restore request to restore at least one file from the point-in-time backup; and creating a file representation of each file to restore in a directory structure of the file system from the metadata image, wherein at least one of the created file representations indicates that the file is stored off-line and has an external identifier used to access information on the file in the database records in the archive instance for the point-in-time backup;

for files having content included in the metadata image, restoring the file content in the file system from the metadata image; and indicating in the file representation for the file restored from the metadata image that the file is on-line.

13. The system of claim 12, wherein the restore request is to restore an entire file system, wherein the operations further comprise:

creating a directory structure of directories from the metadata image in the file system, wherein the file representation of each file in the file system is included in directories in the directory structure as indicated in the metadata image.

14. The system of claim 12, wherein the operations further comprise:

receiving a request for a file in the file system;

determining whether the file representation of the requested file indicates that the file is off-line;

sending a restore request indicating the external identifier of the file in the archive instance in response to determining that the file representation indicates that the file is offline; and indicating in the file representation of the file that the file is on-line in response to restoring the file in the file system from the restore request.

15. The system of claim 12, wherein backed-up files are stored in a backup storage, wherein the file representation further includes an archive instance identifier of the archive instance from which the file system was restored, wherein the operations further comprise:

sending a restore request for a file in the file system whose file representation indicates that the file is off-line, wherein the restore request includes the archive instance identifier and the external identifier of the file to restore;

accessing the archive instance identified in the restore request;

accessing the database record in the accessed archive instance associated with the external identifier of the file to restore;

determining a location in the backup storage indicated in the accessed database record of the file to restore; and accessing the file at the determined location in the backup storage to return to the restore request to restore in the file system.

16. The system of claim 12, wherein the restore request is a partial restore to restore at least one directory into the file system from the point-in-time backup, wherein the file representations are created for each file in the at least one directory to restore from the metadata image, wherein the operations further comprise:

determining whether the at least one directory to restore currently exists in the file system prior to the restore;

deleting files in the determined at least one directory to restore that currently exist; and creating the file representations for the files in the determined at least one directory that currently exists from the metadata image.

17. A system for backing-up a file system using a backup database, comprising:

a processor; and a computer readable storage medium including code executed by the processor to perform operations, the operations comprising:

maintaining for a point-in-time backup, as of a point-in-time, a metadata image of the file system including information on files and directories in the file system as of the point-in-time and an archive instance including a copy of database records in the backup database for the files in the point-in-time backup;

receiving a restore request to restore at least one file from the point-in-time backup; and creating a file representation of each file to restore in a directory structure of the file system from the metadata image, wherein at least one of the created file representations indicates that the file is stored off-line and has an external identifier used to access information on the file in the database records in the archive instance for the point-in-time backup, wherein the restored directory structure includes a first directory name including a plurality of file representations that include the first directory name in a unique identifier to identify the database record for the file;

renaming the first directory name in the directory structure to a second directory name following the restoration of the file system in response to the restore request;

receiving a request to access at least one file in the second directory name whose file representation indicates that the file is off-line;

sending a restore request including the first directory name to identify the requested file in the archive instance;

storing the file returned in response to the restore request in the second directory name in the file system.

18. A method performed within a computer system, comprising:

maintaining for a point-in-time backup, as of a point-in-time, a metadata image of a file system including information on files and directories in the file system as of the point-in-time and an archive instance including a copy of database records in a backup database for the files in the point-in-time backup, wherein the metadata image includes content of files that have a size less than a threshold size;

receiving a restore request to restore at least one file from the point-in-time backup;

creating a file representation of each file to restore in a directory structure of the file system from the metadata image, wherein at least one of the created file representations indicates that the file is stored off-line and has an external identifier used to access information on the file in the database records in the archive instance for the point-in-time backup;

for files having content included in the metadata image, restoring the file content in the file system from the metadata image; and indicating in the file representation for the file restored from the metadata image that the file is on-line.

19. The method of claim 18, wherein the restore request is to restore an entire file system, wherein the operations further comprise:

creating a directory structure of directories from the metadata image in the file system, wherein the file representation of each file in the file system is included in directories in the directory structure as indicated in the metadata image.

20. The method of claim 18, wherein the operations further comprise:

receiving a request for a file in the file system;

determining whether the file representation of the requested file indicates that the file is off-line;

sending a restore request indicating the external identifier of the file in the archive instance in response to determining that the file representation indicates that the file is offline; and indicating in the file representation of the file that the file is on-line in response to restoring the file in the file system from the restore request.

21. The method of claim 18, wherein the file representation further includes an archive instance identifier of the archive instance from which the file system was restored, wherein the operations further comprise:

sending a restore request for a file in the file system whose file representation indicates that the file is off-line, wherein the restore request includes the archive instance identifier and the external identifier of the file to restore;

accessing the archive instance identified in the restore request;

accessing the database record in the accessed archive instance associated with the external identifier of the file to restore;

determining a location in a backup storage indicated in the accessed database record of the file to restore; and accessing the file at the determined location in the backup storage to return to the restore request to restore in the file system.

22. The method of claim 18, wherein the restore request is a partial restore to restore at least one directory into the file system from the point-in-time backup, wherein the file representations are created for each file in the at least one directory to restore from the metadata image, wherein the operations further comprise:

determining whether the at least one directory to restore currently exists in the file system prior to the restore;

deleting files in the determined at least one directory to restore that currently exist; and creating the file representations for the files in the determined at least one directory that currently exists from the metadata image.

23. A method performed within a computer system, comprising:

maintaining for a point-in-time backup, as of a point-in-time, a metadata image of a file system including information on files and directories in the file system as of the point-in-time and an archive instance including a copy of database records in a backup database for the files in the point-in-time backup;

receiving a restore request to restore at least one file from the point-in-time backup;

creating a file representation of each file to restore in a directory structure of the file system from the metadata image, wherein at least one of the created file representations indicates that the file is stored off-line and has an external identifier used to access information on the file in the database records in the archive instance for the point-in-time backup, wherein the restored directory structure includes a first directory name including a plurality of file representations that include the first directory name in a unique identifier to identify the database record for the file;

renaming the first directory name in the directory structure to a second directory name following the restoration of the file system in response to the restore request;

receiving a request to access at least one file in the second directory name whose file representation indicates that the file is off-line;

sending a restore request including the first directory name to identify the requested file in the archive instance;

storing the file returned in response to the restore request in the second directory name in the file system.

* * * * *